United States Patent
Lu et al.

(10) Patent No.: US 9,605,181 B2
(45) Date of Patent: Mar. 28, 2017

(54) MICROPATTERNED STRUCTURES FOR FORMING A SEAL WITH THE FACE SKIN AND OTHER SURFACES AND METHOD OF MAKE

(71) Applicants: Jue Lu, Okemos, MI (US); Amirpasha Peyvandi, Lansing, MI (US); Saqib Ul Abideen, Lansing, MI (US); Anagi Balachandra, Lansing, MI (US)

(72) Inventors: Jue Lu, Okemos, MI (US); Amirpasha Peyvandi, Lansing, MI (US); Saqib Ul Abideen, Lansing, MI (US); Anagi Balachandra, Lansing, MI (US)

(73) Assignee: Metna Co

( * ) Notice: Subject to any disclaimer, the term of this patent is extended or adjusted under 35 U.S.C. 154(b) by 482 days.

(21) Appl. No.: 14/275,966

(22) Filed: May 13, 2014

(65) Prior Publication Data

US 2015/0329743 A1    Nov. 19, 2015

(51) Int. Cl.
*C09J 7/00*    (2006.01)

(52) U.S. Cl.
CPC ........... *C09J 7/00* (2013.01); *C09J 2201/626* (2013.01); *C09J 2400/22* (2013.01); *Y10T 428/2481* (2015.01)

(58) Field of Classification Search
CPC .... C09J 2201/626; C09J 2201/28; C09J 5/00; C09J 7/00; C09J 7/02; C09J 7/0207; C09J 2400/22; C09J 9/00; B82Y 10/00; B82Y 40/00; B82Y 30/00; G03F 7/0002; G03F 7/0017; G03F 7/09; A61M 16/06; A61M 37/0015; A61M 2205/02; A61M 2037/003; A61M 2037/0023; A61M 2005/005; A61M 2205/3306; A61M 5/3015; A61M 2037/0046; A61M 2037/0053; A61M 2037/0061; A61M 37/00; Y10T 428/2481
USPC ..................................... 428/85–97
See application file for complete search history.

(56) References Cited

U.S. PATENT DOCUMENTS

| 2,150,238 | A | * | 3/1939 | Mosier | H01B 3/50 139/387 A |
|---|---|---|---|---|---|
| 6,196,223 | B1 | | 3/2001 | Belfer et al. | |
| 7,294,397 | B2 | | 11/2007 | Jagota et al. | |
| 7,479,198 | B2 | | 1/2009 | Guffrey et al. | |

(Continued)

OTHER PUBLICATIONS

Autumn, K. and N. Gravish (2008). "Gecko adhesion: Evolutionary nanotechnology." Philosophical Transactions of the Royal Society A: Mathematical, Physical and Engineering Sciences 366: 1575-1590.

(Continued)

*Primary Examiner* — Jennifer Chriss
*Assistant Examiner* — Rebecca Janssen

(57) ABSTRACT

The present invention is directed towards an article suitable for attachment to facial skin or other surfaces, which comprises microfibrils and continuous microribbons. The article provides good sealing when used on a regular skin, and on a challenge skin surface with facial hair, sweat and acnes. The article also provides good adhesion and sealing on any other rough surfaces, and can be used repeatedly against different surfaces. These dry adhesives can be used for improving sealing of mask respirators, swimming goggles, or for other applications such as medical bandage, working gloves, and protective clothing seal.

11 Claims, 12 Drawing Sheets

(56) References Cited

U.S. PATENT DOCUMENTS

| | | | |
|---|---|---|---|
| 7,479,318 B2 | 1/2009 | Jagota et al. | |
| 7,632,417 B2 | 12/2009 | Suh et al. | |
| 7,700,173 B2 | 4/2010 | Jagota et al. | |
| 2009/0041986 A1 | 2/2009 | Zhang et al. | |
| 2009/0092784 A1* | 4/2009 | Jagota | B32B 27/08 |
| | | | 428/86 |
| 2009/0114618 A1 | 5/2009 | Zhang et al. | |
| 2010/0021528 A1* | 1/2010 | Sackinger | A61L 15/18 |
| | | | 424/447 |
| 2010/0136281 A1 | 6/2010 | Sitti et al. | |
| 2010/0159778 A1 | 6/2010 | Hughes et al. | |

OTHER PUBLICATIONS

Dai, J. C., J. Z. Yang and Z. Q. Zhuang (2011). "Sensitivity analysis of important parameters affecting contact pressure between a respirator and a headform." International Journal of Industrial Ergonomics 41(3): 268-279.

Marcott, S. A., S. Ada, P. Gibson, T. A. Camesano and R. Nagarajan (2012). "Novel Application of Polyelectrolyte Multilayers as Nanoscopic Closures with Hermetic Sealing." ACS Applied Materials & Interfaces 4(3): 1620-1628.

Del Campo, A.,del Campo, A., C. Greiner and E. Arzt (2007). "Contact shape controls adhesion of bioinspired fibrillar surfaces." Langmuir 23(20): 10235-10243.

Lir, I., M. Haber and H. Dodiuk-Kenig (2007). "Skin surface model material as a substrate for adhesion-to-skin testing." Journal of Adhesion Science and Technology 21(15): 1497-1512.

\* cited by examiner

MICROPATTERNED STRUCTURES FOR FORMING A SEAL WITH THE FACE SKIN AND OTHER SURFACES AND METHOD OF MAKE

FEDERALLY SPONSORED RESEARCH OR DEVELOPMENT

The present invention was supported in part by Grant Number W911NF-10-C-0060 awarded by the Department of Defense. The U.S. Government may have certain rights in the invention.

CROSS-REFERENCE TO RELATED APPLICATIONS

Not applicable.

BACKGROUND—PRIOR ART

The following is a tabulation of some prior art that presently appears relevant:

U.S. Patents

| Patent Number | Kind Code | Issue Date | Patentee |
| --- | --- | --- | --- |
| 6,196,223 | B1 | 2001 Mar. 6 | Belfer et al. |
| 7,700,173 | B2 | 2010 Apr. 20 | Jagota et al. |
| 7,294,397 | B2 | 2007 Nov. 30 | Jagota et al. |
| 7,632,417 | B2 | 2009 Dec. 15 | Suh et al. |
| 7,479,198 | B2 | 2009 Jan. 20 | Guffrey et al. |
| 7,479,318 | B2 | 2009 Jan. 20 | Jagota et al. |

U.S. Patent Application Publications

| Publication Nr. | Kind Code | Publ. Date | Applicant |
| --- | --- | --- | --- |
| 2010/0159778 | A1 | 2010 Jun. 24 | Hughes et al |
| 2010/0136281 | A1 | 2010 Jun. 3 | Sitti et al. |
| 2009/0114618 | A1 | 2009 May 7 | Zhang et al. |
| 2009/0041986 | A1 | 2009 Feb. 12 | Zhang et al. |
| 13/565,295 | | 2012 Aug. 2 | Lu et al. |

Nonpatent Literature Documents

Autumn, K. and N. Gravish (2008). "Gecko adhesion: Evolutionary nanotechnology." *Philosophical Transactions of the Royal Society A: Mathematical. Physical and Engineering Sciences* 366: 1575-1590.
Dai, J. C., J. Z. Yang and Z. Q. Zhuang (2011). "Sensitivity analysis of important parameters affecting contact pressure between a respirator and a headform." *International Journal of Industrial Ergonomics* 41(3): 268-279.
del Campo, A., C. Greiner and E. Arzt (2007). "Contact shape controls adhesion of bioinspired fibrillar surfaces." *Langmuir* 23(20): 10235-10243.
Lir, I., M. Haber and H. Dodiuk-Kenig (2007). "Skin surface model material as a substrate for adhesion-to-skin testing." *Journal of Adhesion Science and Technology* 21(15): 1497-1512.
Marcott, S. A., S. Ada, P. Gibson, T. A. Camesano and R. Nagarajan (2012). "Novel Application of Polyelectrolyte Multilayers as Nanoscopic Closures with Hermetic Sealing." *Acs Applied Materials & Interfaces* 4(3): 1620-1628.

FIELD OF INVENTION

The present invention relates to dry adhesives, and more particularly micropatterned polymeric structures with discrete microfibrils and continuous microribbons, when incorporated as the peripheral seal of respiratory masks, providing adhesion and improved sealing on clean, shaved skin, and on a challenge skin surface with facial hair, sweat and acnes, without head harness, or with minimum head harness support. Other applications such as swimming goggles, medical bandage, working gloves, and protective clothing seal can also benefit from using of the present invention.

BACKGROUND OF THE INVENTION

There are many products that enable sealing when contact is made to facial skin, such as those used in face masks and swimming goggles. Conventional respiratory masks have flexible and smooth sealing surfaces extending around the periphery of masks, which are meant to provide more thorough contact with facial skin for effective sealing (Dai, Yang et al. 2011). The following conditions need to be met for improved sealing against skin: (i) the seal material used in masks must have sufficient bulk, compressibility and/or surface area at the mask periphery to prevent leakage; and (ii) the seal material should be flexible in order to conform to the user's facial contour, hindering formation of gaps while providing a degree of comfort, as taught in U.S. Pat. No. 6,196,223 B1. The most common materials used for peripheral sealing are elastomeric compounds such as urethanes, polyvinylchloride foam, polytetrafluoroethylene foam, acrylic foam, polyethylene foam, urethane foams, ethyl vinyl acetate, silicones, rubber, neoprene, and combinations thereof. In order to achieve desired sealing of the respirator against the user's face, especially with body movements, relatively large forces must be transferred via the frame of the mask to the seal-skin contact area; elastic or cloth straps, passing over and around the face and head, are used for application of these forces. Effective sealing would be realized under the pressure applied by head harness, as far as the face is shaved and cleaned prior to donning the mask; this requirement, however, cannot be met consistently in the battlefield or in other emergency situations where the presence of sweat, facial hair, oils, dirt, or acne on facial skin could compromise the effectiveness of peripheral seals. Other than sealing, comfort is an important performance requirement sought by respirator designers, users, and standards developers. Contact pressure, shear stress and friction are three major physical factors which determine the comfort level during respirator use (Dai, Yang et al. 2011). Pressures beyond a certain level can stop blood flow and cause tissue damage. Studies have shown that pressures as low as 1.35 psi (9.3 kPa) applied over two hours will cause moderate changes in muscle structure, and tissue damage can be expected if a mask is worn for 12 hours under a pressure of 2 psi (13.8 kPa).

New materials are under development for improving seal qualities of mask respirators, including gels and shape memory polymers, which offer better conformability against facial skin. US patent application 2010/0159778 A1 describes using compressible materials, such as foam and meltblown web for forming seal when in contact with skin. U.S. Pat. No. 6,196,223 B1 discloses a strapless respiratory facial mask for customizing to the wearer's face; this approach uses an adhesive layer for engaging the facial contours and the skin of the wearer's face. The use of a conventional pressure sensitive adhesive (PSA) in this system, however, limits its repeated use, compromises its action against wet (sweaty), dirty or unshaven skin, challenges convenient peeling of the mask off the facial skin, and could cause variations in seal quality with temperature change. In addition, peeling resistance of conventional PSA is generally high, which may cause pain and skin damage when removing masks from the skin surface. Adhering the peripheral seal to skin would benefit from introduction of new adhesives with improved stability and reliability for repeated use in severe service environments against sweaty, dirty and unshaven skin.

Dry adhesives inspired by gecko-foot provide desired conformability and adhesion capacity. Examination of the structure of gecko-foot shows rows of setal arrays, with each array consisting of thousands of micro-scale setal stalks, amounting to ~200,000 setae per toe. Each seta terminates with 100-1000 nano-scale spatula, amounting to ~100 million spatulae per toe, or ~2 billion spatulae per animal. The nano-scale geometry of the terminal elements (spatulae) of gecko-foot enables thorough contact of spatulae against rough surfaces to promote intermolecular and capillary attractions over a major fraction of the apparent contact area. These adhesives provide for repeatable adhesion to a variety of surfaces with weak van der Waals forces (Autumn and Gravish 2008). Capillary action complements van der Waals forces for adhesion to moist surfaces. The unique adhesion mechanism of gecko-adhesive also provides convenient peeling, and self-cleaning attributes. Manufacturing of microfibrillar structures to mimic the gecko-foot structure is known in the art. For example, US patent application US2010/0136281 A1 (60/874,787) discloses a dry adhesive based on polymeric microfibrillar arrays and a method of forming a dry adhesive using soft molding of polymer precursors. U.S. Pat. Nos. 7,700,173 B2 and 7,294,397 B2 teach selection of material and designs for conformal contact and adhesion using fibrillar surfaces. U.S. Pat. No. 7,632,417 B2 teaches a method of forming a nanostructure having a nano-sized diameter and a high aspect ratio via microcontact printing using an engraved part of the mold. Other patents, such as U.S. Pat. No. 7,479,198 B2, U.S. Pat. No. 7,479,318 B2, and patent application US 2009/0114618 A1 and US 2009/0041986 A1 are focused on the manufacturing of a gecko-like hierarchical fibrillar microstructures. All these cited prior arts have been focusing on the geometrical design (i.e. dimensions and spacing of the pillars, shapes of the tips), and mechanical properties of the constituent materials. These bio-inspired adhesives provide strong and repeatable adhesion against smooth and rough surfaces; however, they still have leakage problems. Biological adhesion mechanisms have evolved in applications where sealing is not a concern; biomimetic adhesives are not, therefore, inherently leak-resistant. Permeation can occur through the generally networked pore system occurring within the fibrillar structures of biological adhesives, compromising their sealing qualities.

It is an object of the present invention to design and manufacture polymer micropatterned structures which mimic the structure of gecko foot, which provide re-applicable adhesion, or high friction under pressure, and also sealing effect when applied on un-cleaned facial skin, or other surfaces with or even without minimum supporting pressure.

SUMMARY

The present invention entails design and manufacturing of micropatterned structures, which maintain a good seal when applied on skin (or other surfaces) even under body movement and in the presence of certain surface irregularities such as facial hair, dirt and acnes. In accordance with one embodiment of the present invention, the micropatterned structure comprises discrete microfibrils and continuous microribbons. In some embodiments, the microribbons may be parallel to each other, or form intersections.

In one aspect, the present invention is designing polymeric microfibrillar surfaces which mimic gecko foot in order to produce dry, re-applicable adhesion to facial skin, without need for supporting pressure, with the adhesion maintained even under motion or skin movement. Microfibrillar and micropatterned structures also provide relatively high friction levels when compared with plain surfaces when subjected to supporting pressure. The adhesion/friction qualities of microfibrillar structures help maintain a good contact/seal with the skin in spite of body movement, while the continuous microribbon blocks permeation of air/gas through the gaps between microfibrils; maintaining a desired sealing effect. Intersection of microribbons form units of discrete microfibrils completely surrounded with microribbons, which yield further improvements in adhesion. Surface treatment of polymer microfibrillar structures can greatly benefit their adhesion capacities in medium- to high-humidity environments due to improved surface wettability. Further improvements can be realized by producing nanostructured surfaces which yield hierarchical structures comprising microfibrils culminating in nanostructured tips, simulating the structure of gecko-foot, for achieving highly desired conformability and adhesion qualities against surfaces of different types, roughness and irregularity conditions. Surface treatments of microfibrillar structures were taught in the U.S. patent application Ser. No. 13/565,295.

BRIEF DESCRIPTION OF THE DRAWINGS

Accompanying drawings help with explaining the invented micropatterned structures for improved sealing qualities, method of making them, and basic principles of their operations.

The accompanying drawings are only for the purpose of illustrating the embodiments of the invented methods, and not for the purpose of limiting the invention. In the drawings.

DETAILED DESCRIPTION

References will be made in detail to various embodiments of the invention, one or more examples of which are set forth below. Each example is illustrative, not limitation of the invention. For those skilled in the art, it is apparent that modifications and variations can be made in the present invention without departing from the scope of the invention. Thus, it is intended that the present invention cover such modifications and variations.

Figure 1:
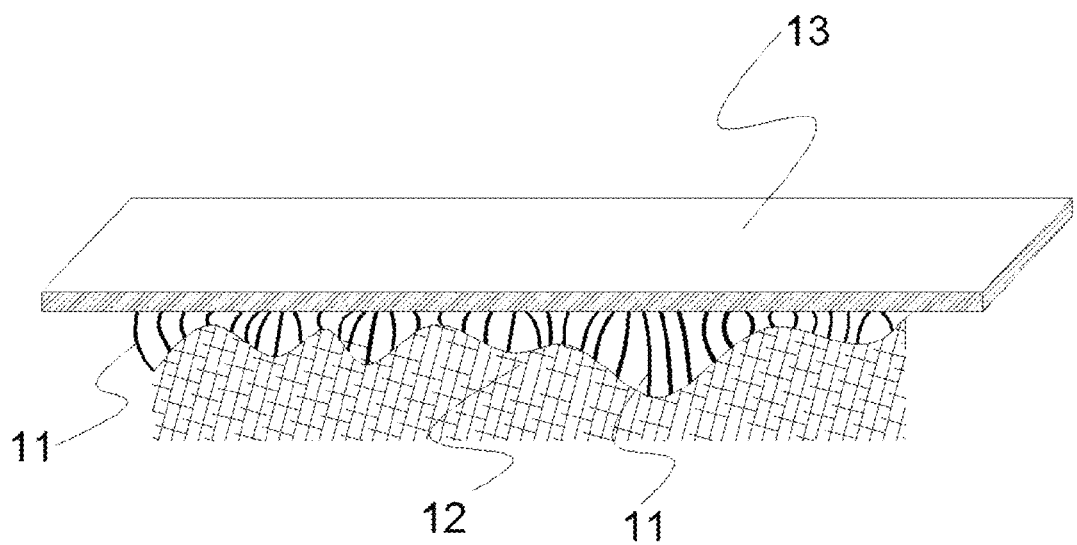
FIG. 1 shows the conformability of micropatterned structures, which form intimate contact with a rough surface.

The present invention is directed to dry adhesives suitable for attachment to the skin of a user, or other surfaces, which comprises microfibrils and continuous microribbons. The term "dry adhesive", as used herein, refers to solid adhesives based on synthetic micro-structures mimicking the gecko-foot adhesion mechanism. Dry adhesives contrast traditional liquid adhesives, including pressure sensitive adhesives which flow under pressure to conform to surface roughness. Unlike dry adhesives taught in previous arts, the dry adhesives disclosed provide not only adhesion and high friction with contact pressure, but also good sealing on a regular skin, or other rough surfaces, even under movement. The present invention is intended for applications where sealing is a primary concern. FIG. 1 shows how the micropatterned surface (including microfibrils 11, and the backing 13) in contact with a rough surface (12). The conformability of microfibrils enables thorough contact of microfibrils against rough surfaces to promote intermolecular and capillary attractions over a major fraction of the apparent contact area. In other words, the fibrillar structure of gecko foot accomplishes the same goal as the liquid-like fluidity (under pressure) of pressure-sensitive adhesives. As the fibrillar interface is pushed against a rough surface, the first contact is made against the higher regions of the surface; with increasing load, fibrils buckle further, and some more fibers establish contact with the lower regions of the rough surface. Depending on the pressure and aspect ratio of fibrils, they can make nearly uniform contact, but some may still remain non-contacted condition, depending on the contact pressure and fibril length. The buckling stress can be calculated using the following equation, as taught in U.S. Pat. No. 7,700,173 B2:

$$\frac{\sigma}{E} = f\frac{\pi^2}{3}\left(\frac{a}{L}\right)^2$$

where, a and L are the radius and length of the fibrils, respectively, f is the area-fraction of fibrils and E is the Young's modulus of the fibrils. This equation indicates that the modulus and aspect ratio of fibrils are major factors determining the buckling stress. Soft materials improve the conformal contact to fairly rough surfaces; with appropriate selection of modulus and aspect ratio, however, a higher-modulus material can be used to achieve improved sealing even when used against a rough surface; fibers of higher modulus discourage adhesion of (dust) particles, which is important in application of the bio-inspired adhesive to respiratory masks.

Figure 2:
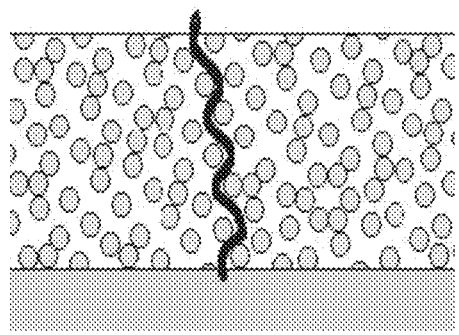
FIG. 2 shows that permeation occurs through the networked pore system within microfibrils of bio-inspired adhesive structures.
Figure 3:
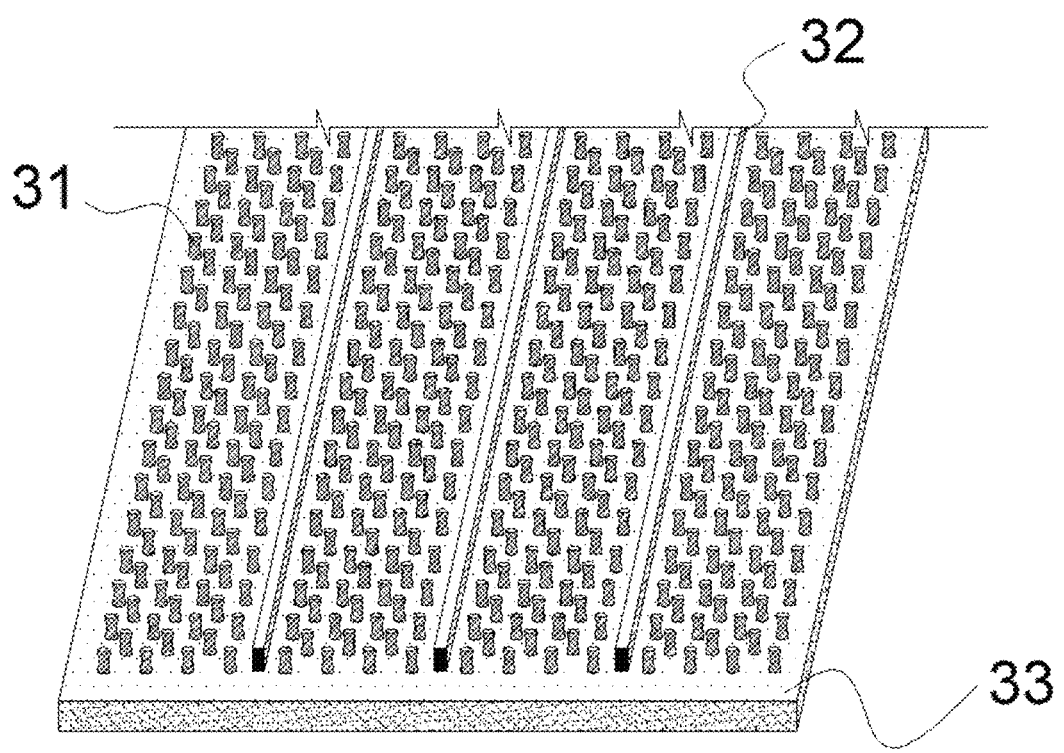
FIG. 3 presents one example of micropatterned structures with parrallel microribbons, where every 60 rows of microfibrils incorporate one continuous 20 µm wide microribbon.
Figure 4:
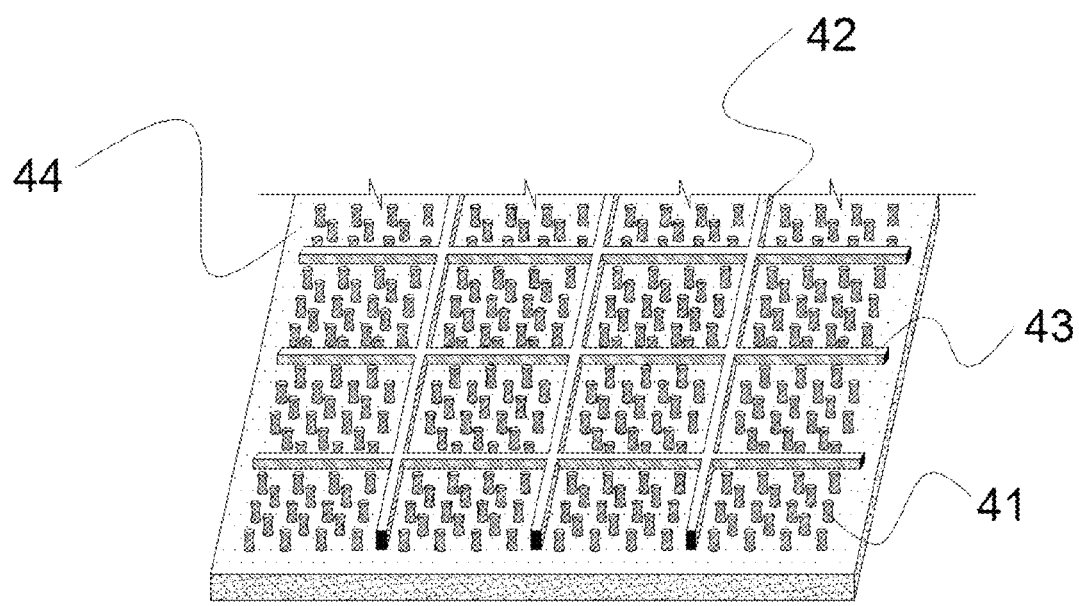
FIG. 4 presents another example of micropatterned structures with inter-crossed microribbons.

These bio-inspired adhesives provide strong and re-applicable adhesion on smooth and rough surfaces; it also provides higher friction than plain (non-fibrillar) surfaces under pressure. The combination of adhesion and friction can secure attachment to the skin or other surface, even under movement. The fibrillar structure could also provide significantly improved sealing qualities when compared with similar plain (non-fibrillar) surfaces. Leakage, however, can occur through the spaces between fibrils comprising the fibrillar structure, as shown in FIG. 2. This invention discloses incorporation of continuous microribbons into fibrillar structures for preventing leakage while still utilizing the high adhesion and friction of fibrillar structures. FIGS. 3 and 4 show example designs of micropatterned structures comprising discrete microfibrils, and continuous microribbons which can be parallel to each other or form intersections. Any number of patterns may be used to form the patterned structures; the microribbons (FIG. 3, Part 32) should form an enclosed structure perpendicular to the direction of air leakage, and the microribbons should preferably intersect. The microribbons can be incorporated once after every 5 to 500 rows of microfibrils, preferably 50 to 100 rows.

FIG. 4 shows a preferred embodiment. The microribbons (FIG. 4, Parts 42 and 43) intersect and form squares within which discrete microfibrils occur (FIG. 4, Part 41). The example design illustrated in FIG. 4 further increased the adhesion and friction of the micro-patterned structure, as every enclosed square formed by intersecting micro-ribbon acts similar to a suction cup, which locally improves the adhesion capacity.

Suitable techniques for fabricating such polymeric fibrillar structures include introduction of incisions on polymer films, hot embossing of polymer melts with microfabricated masters, direct drawing of polymer fibrils, lithographic structuring of resist films, filling of nano-porous membranes, and soft-molding of elastomeric precursors on microfabricated templates.

Soft molding is preferred as a relatively simple and inexpensive process, which provides flexibility in tailoring the geometry and curvature of fibrillar structures. The polymeric materials can be any thermoplastic or thermosetting polymers, including elastomers, such as, but not limited to, epoxy, poly(methyl methacrylate) (PMMA)), polypropylene (PP), polyurethane (PU) and polydimethylsiloxane (PDMS); PU and PDMS are preferred for hygienic purpose. The Young's modulus of polymeric materials is preferably in the range of 0.6~5.0 MPa.

Figure 5:
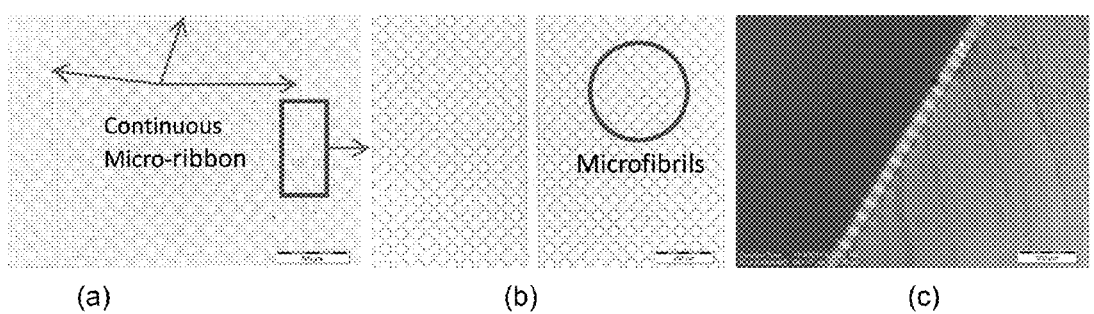
FIG. 5 presents optic microscope images of polydimethylsiloxane (PDMS) fibrillar arrays incorporating distributed micro-ribbons: (a) and (b) are top views at 40× and 400× magnifications, respectively; and (c) side view.

Diameters of fibrils are in the range from 1 micrometer to 1000 micrometer, preferably 1 to 200 micrometer, and length in the range of 1 micrometer to 3000 micrometer, preferably 5 to 1000 micrometer. The preferred aspect ratio (length/diameter) of fibrils is ≥1. The center-to-center spacing between adjacent fibrils should be large enough to prevent clustering of fibrils; the preferred spacing depends upon the selection of materials, and the diameter and length of fibrils. One skilled in the art can design suitable combinations of diameter and length for achieving desired adhesion. The width of the microribbons can be similar to or larger than the diameter of fibrils. FIG. 5 shows an example bio-inspired adhesive composed of PDMS fibrils with diameter of 20 micrometer and length of 20 micrometer, incorporating distributed micro-ribbons, which is produced by soft molding on microfabricated templates. FIGS. 5 (a) and (b) show top views of the micropatterned structure at 40× and 400× magnifications, respectively; FIG. 5(c) shows a side view of the structure. This design has one continuous micro-ribbon surrounding 60 rows of microfibrils in a square design to render sealing effects. The tips of fibrils can be enlarged to assume mushroom-like shapes which provide improved adhesion, as described in "Contact shape controls adhesion of bioinspired fibrillar surfaces" (del Campo, Greiner et al. 2007). The fibril tips can be further treated using UV/Ozone (UVO) or oxygen plasma to enhance the wettability of polymer surfaces, as taught in U.S. patent application Ser. No. 13/565,295. Coating the micropatterned structure with a single layer or multiple layers of polyelectrolyte after UVO or oxygen plasma treatment can hinder hydrophobic recovery of fibril tip surfaces, and also increase nanocontacts, as described in the study by Marcott et al. (Marcott, Ada et al. 2012). Polyelectrolytes can be linear, branched, or crosslinked, or copolymers. Example polyelectrolytes include polyethyleneimine (PEI), poly(allyl amine) (PAH), polyacrylic acid, polystyrene sulfonate, and poly (diallyl dimethyl ammonium chloride) (PDAC). Preferred polyelectrolytes are positively charged (or cationic) polyelectrolytes such as PAH, PEI and PDAC, more preferably PEI.

Shear Adhesion and Friction (Shear Resistance)

Figure 6:
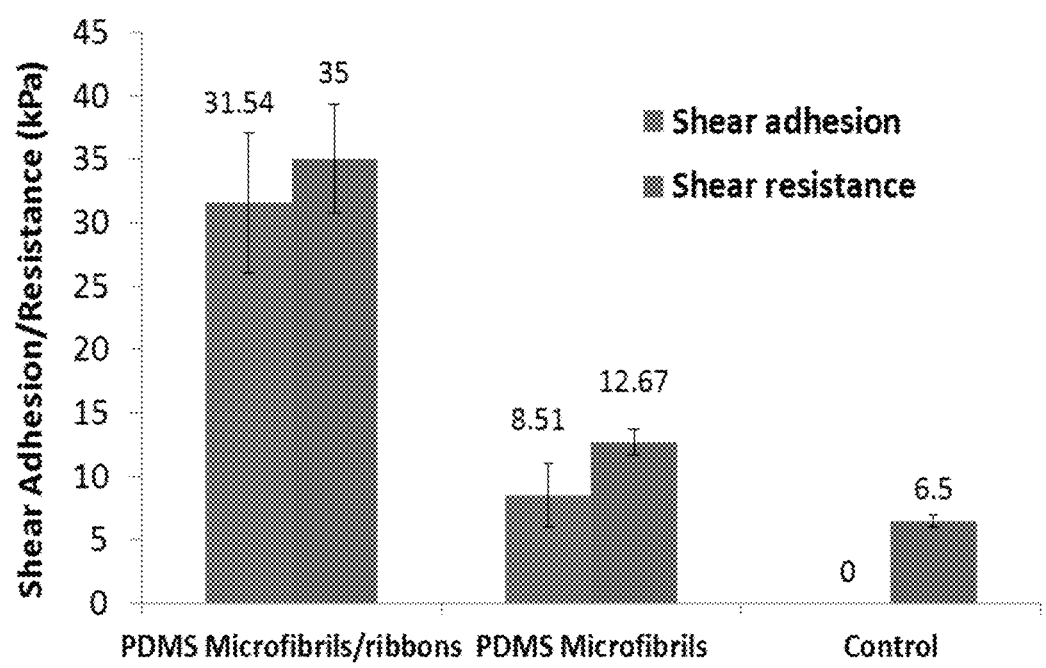
FIG. 6 compares the shear adhesion and resistance of PDMS micropatterned structures with and without ribbons, and the control PDMS surface (with typical surface roughness) against a synthetic skin with a relatively smooth female skin morphology.
Figure 7:
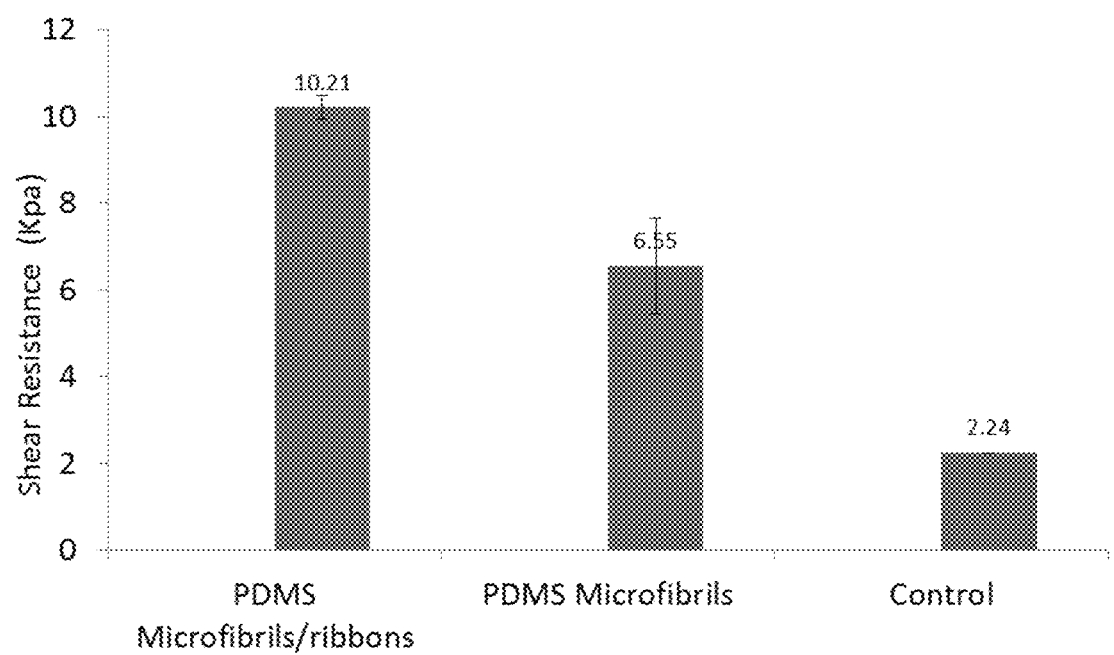
FIG. 7 compares the shear resistance (friction) of PDMS micropatterned structures with and without ribbons versus the control PDMS surface (with typical surface roughness) against a synthetic skin with relatively rough male skin morphology and facial hair.

Shear adhesion and friction qualities of polymer micropatterned structures were evaluated against the synthetic skin made of polyvinyl chloride (PVC) with a relatively smooth female skin or a rough male face skin. The synthetic skin simulating the surface properties of a real human facial skin was developed following the method used in "Skin surface model material as a substrate for adhesion-to-skin testing" (Lir, Haber et al. 2007). For comparison, the commercial elastomeric material used for the respirator N95 (5400 series face seal from North Safety Products) was used as control. FIG. 6 compares the adhesion capacities of PDMS micropatterned structures (with and without microribbons) and control elastomer against the synthetic skin with female skin morphology. The shear adhesion capacity of the micropatterned structure with ribbon is much higher than that of the microfibrilar structure alone, while the control elastomer did not give any adhesion. In case the application of head harness is found to be necessary, shear resistance under a contact pressure of 4.9 kPa was evaluated on the same substrate, as shown in FIG. 6. The shear resistance for each material evaluated is higher than the corresponding shear adhesion capacity. The resistance is much higher for the surface with a micro-patterned structure compared to the plain one, which is due to the rise in contact area with introduction of microfibrils. Friction coefficients were calculated to be 7.5, 2.1 and 1.3 for the PDMS micropatterned structure with and without microribbons, and the control elastomer, respectively. It is clear that the micropatterned structures with ribbon have much higher shear adhesion and resistance than the one without, which may be due to the enclosed area formed by microribbons acting as a suction cup. The high adhesion and friction attributes can benefit from securing the mask in place to prevent the mask sliding, especially when in motion. FIG. 7 compares the shear resistance of these materials against synthetic skin with male skin morphology and facial hair. Shear resistance was much less on the rough PVC due to less contact, but in general, the micropatterned surface still gave much higher resistance compared to control.

Sealing Performance

The sealing performance of polymeric micropatterned structures was evaluated using a simple set up built in-house. A nozzle was connected to a vacuum pressure gage at one end, and to a syringe at the other end. A PVC substrate (synthetic skin) with a punched hole of 3 mm (⅛ in) diameter was fixed on top of the nozzle using double-sided tape. No pressure decay was observed when a double-sided tape was used to cover the hole, confirming that no leakage occurred in the whole system. The dry adhesive sample was then placed, facing down, on the substrate to cover the hole. A certain preload was placed on top of the sample, and the plunger of the syringe was pulled out to create a suction of 25 mm water column height. The time required for this vacuum to dissipate was recorded. For the modified adhesives, 25 mm water pressure was created instead of vacuum, to better mimic the working environment of the respirator. NIOSH commonly uses 20-25 mm $H_2O$ as the upper pressure limit in the certification protocol for testing the filtering materials used in facepieces respirators.

Figure 8:
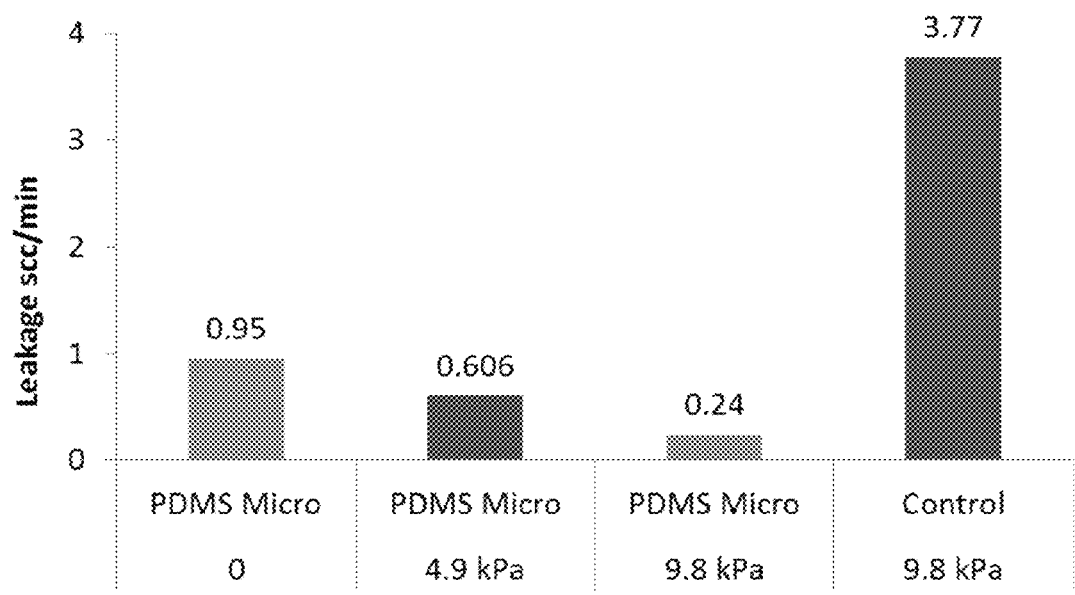
FIG. 8 compares the sealing performance of PDMS micropatterned structures against a synthetic skin with female skin morphology.
Figure 9:
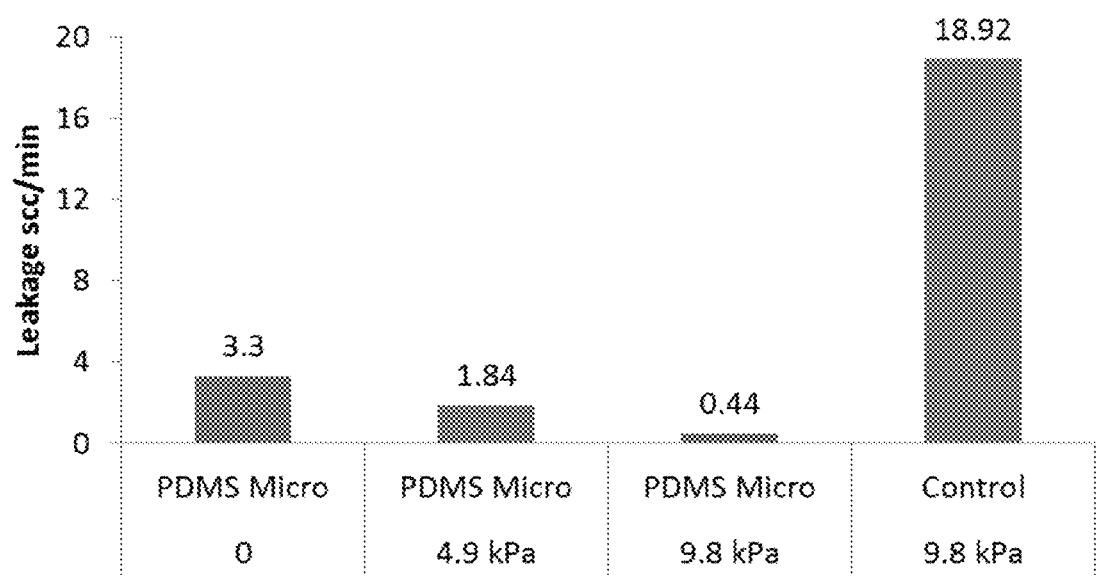
FIG. 9 compares the sealing performance of PDMS micropatterned structures against a synthetic skin with male skin morphology and facial hairs.

FIGS. 8 and 9 compare the sealing performance of PDMS micropatterned structures with ribbons acting against the synthetic skin (PVC substrate) of relatively smooth and rough (skin) morphologies, respectively. Due to the desired adhesion qualities of PDMS microfibrillar structure against PVC, the sealing performance was generally very good on the smooth synthetic skin, even with no contact pressure. The sealing performance of PDMS micropatterned structures improved with increasing contact pressure. The control system leaked at the moment of removing the preload; a minimum contact pressure of 9.8 KPa was required to maintain the minimum sealing requirement (<15 ml/min). On an extremely challenging skin morphology, representing the presence of dense facial hair, PDMS microfibrillar structures still provided satisfactory sealing with or without contact pressure, while the control system could not meet the minimum sealing performance even with a contact pressure of 9.8 KPa, as shown in FIG. 9.

Figure 10:
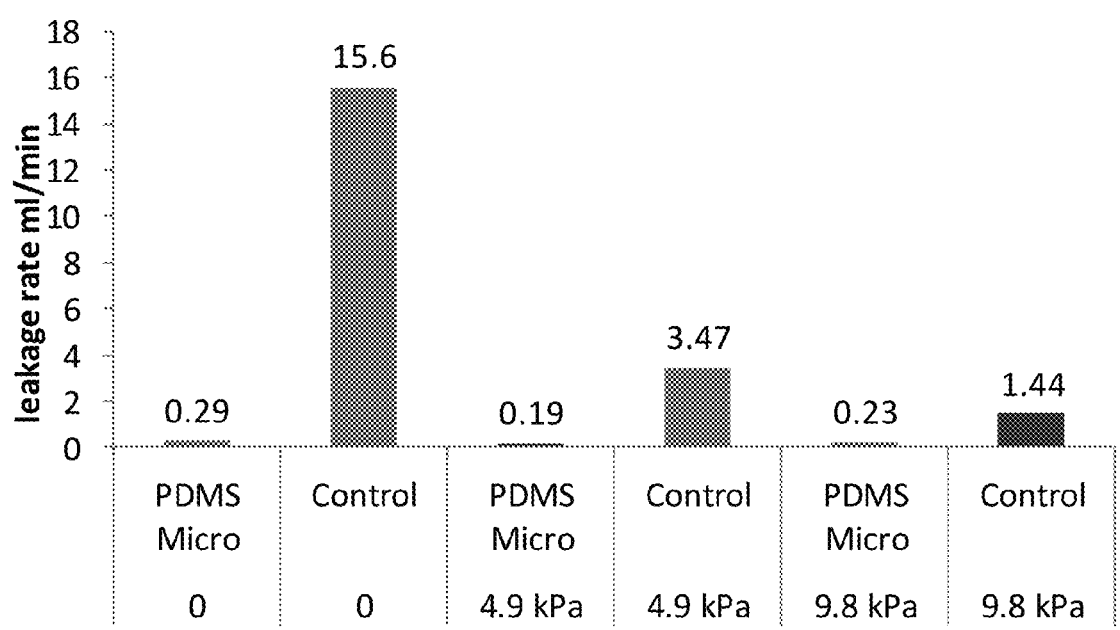
FIG. 10 compares the sealing performance of PDMS micropatterned structures against a wet synthetic skin with female skin morphology.
Figure 11:
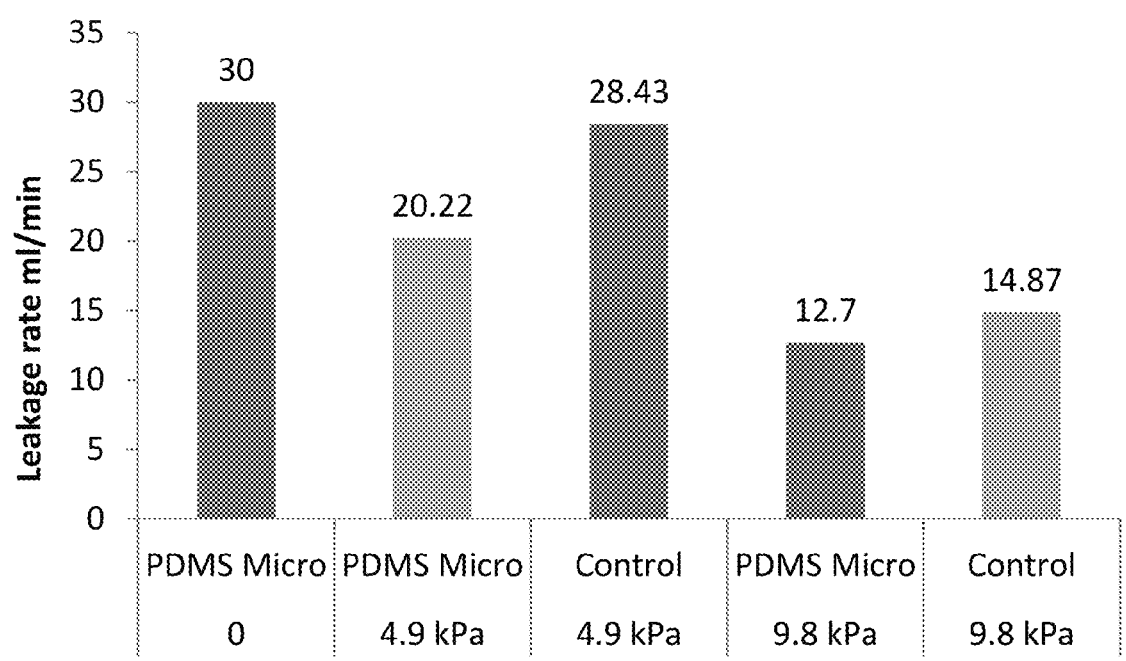
FIG. 11 compares sealing performance of PDMS microfibrillar arrays against a wet synthetic skin with male skin morphology and facial hairs.

The sealing performance of the PDMS microfibrillar structure against a wet surface with facial skin morphology was also evaluated; this test mimics the condition of a sweaty facial skin. As shown in FIG. 10, sealing performance against the wet synthetic skin with female skin morphology was actually much better than that against the dry synthetic skin, shown in FIG. 8, which is probably due to the contribution of capillary effect to the adhesion of fibrillar structures and the blocking effect of moisture at the interface. Again, PDMS micropatterned structures performed significantly better than the control system. The wet PVC (synthetic skin) with male skin morphology and facial hair represented the greatest challenge, as shown in FIG. 11. A contact pressure of 9.8 KPa was required for PDMS micropatterned structures to meet the maximum leakage requirement.

Comparison of Four Facial Conditions (Dry/Wet, Shaved/Unshaved, One Subject)

Figure 12:
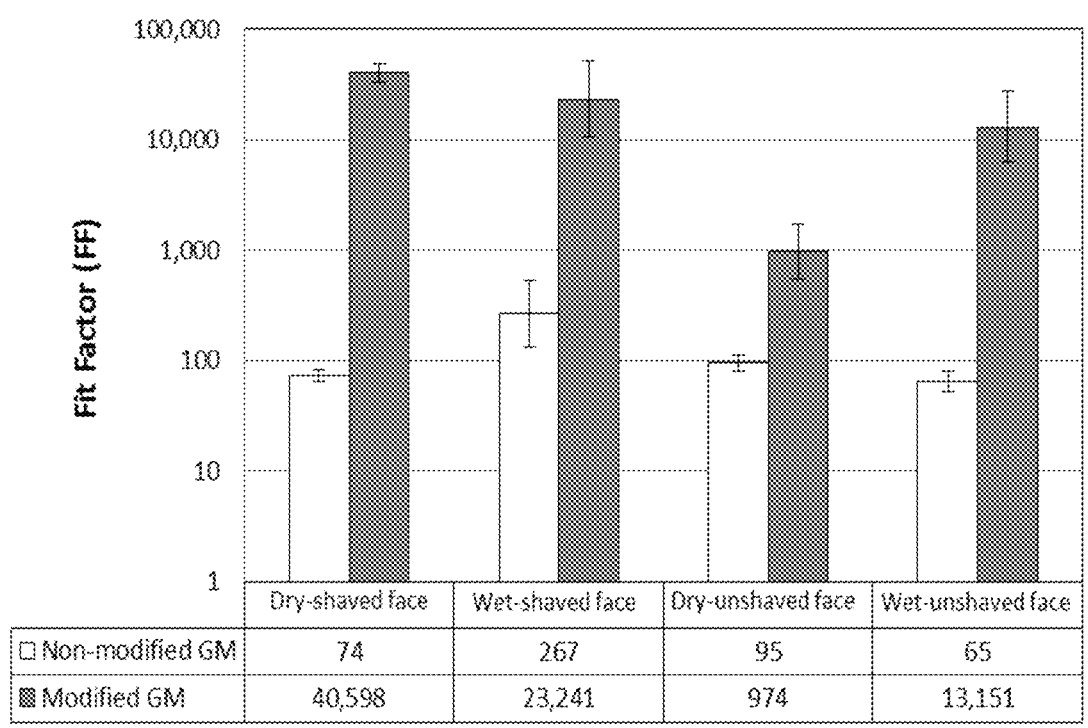
FIG. 12 presents fit factors (FFs) determined for a subject with four facial conditions while wearing a conventional (non-modified) and a polyurethane micropatterned structure-modified elastomeric half-mask respirator. Bars represent geometric means; error bars represent geometric standard deviations for three replicated tests. (GM: geometric mean).

FIG. 12 compares the Fit factors (FFs) determined for a human subject with four facial conditions while wearing a conventional (non-modified) half-mask elastomeric respirator and one modified with polymer micropatterned structure. The chosen respirator model (Model: 6000 series, 3M) is widely used in a variety of occupational environments; it is equipped with two P100 pancake-shaped filters (Model: 2091, 3M, Minneapolis, Minn., USA). The respirator was modified by manually attaching PU micropatterned-strips (with micropatterned structure shown in FIG. 3) with 2 cm width onto the presumed sealing surface of the half-mask respirator. A non-modified version of the same respirator model and size was used for comparison purposes. A standard fit test program was conducted using a TSI Portacount. The test respirator was donned on a human subject who performed a series of exercises following the standard OSHA fit testing protocol, including normal breathing, deep breathing, turning head side-to-side and up-and-down, etc. (total of seven exercises). Four facial conditions were compared: dry-shaved face, wet-shaved face, dry-unshaved face, and wet-unshaved face, with three repeats for each condition. The modified respirator produced higher mean FFs under all test conditions when compared with the non-modified respirator. For example, in the case of the wet-shaved facial condition, the modified half-mask achieved a mean FF of 23,241 versus 267 for the non-modified half-mask. Even the least remarkable difference identified for the dry-unshaved face was an order of magnitude higher with the modified versus the unmodified respirator (mean FF=974 vs. 95). Paired t-test results showed that the modified respirator had significantly ($p<0.05$) higher mean FFs for all facial conditions (dry-shaved, wet-shaved, dry-unshaved, and wet-unshaved). These test results indicate that the surface of the micropatterned structure improved contact against facial skin in various challenge conditions (shaved, unshaved, dry, and wet).

What is claimed is:

1. A micropatterned polymeric structure that provides adhesion, high friction under contact pressure and sealing against a contact surface which can be smooth, rough or wet, the micropatterned structure comprising:
a polymeric substrate;
an array of discrete polymeric microfibrils protruding from a surface of the substrate, with average microfibril cross-sectional dimension of 1 to 1000 micrometer, microfiber length of 1 to 3000 micrometer, microfibril length to cross-sectional dimension ratio greater than or equal to 1;
and
rows of continuous polymeric microribbons in between microfibrils, with microribbon width equal to or greater than the average microfibril cross-sectional dimension, and 5 to 500 rows of microfibrils occurring between two consequent microribbons.

2. The micropatterned structure of claim 1, wherein the average microfibril cross-sectional dimension is 1 to 200 micrometer, the microfibril length is 5 to 1000 micrometer, and 50 to 100 rows of microfibrils occurring between two consequent microribbons.

3. The micropatterned structure of claim 1, wherein the microfibers have circular cross-sectional geometries.

4. The micropatterned structure of claim 1, wherein the microribbons are mostly aligned perpendicular to the primary direction of air leakage.

5. The micropatterned structure of claim 1, wherein the microribbons form closed geometries surrounding microfibrils.

6. The micropatterned structure of claim 1, wherein the polymeric structure is made of epoxy, poly(methyl methacrylate) (PMMA)), polypropylene (PP), polyurethane (PU), polydimethylsiloxane (PDMS), and combinations thereof.

7. The micropatterned structure of claim 1, wherein the polymeric structure is made of hygienic PU and PDMS polymers, and combinations thereof.

8. The micropatterned structure of claim 1, wherein in the polymeric structure is made of polymeric materials with Young's modulus in the range of 0.6 to 5.0 MPa.

9. The micropatterned structure of claim 1, wherein polymeric microstructures are made by a process, comprising: introduction of incisions on polymer films, hot embossing of polymer melts with micro-fabricated masters, direct drawing of polymer fibrils, lithographic structuring of resist films, filling of nano-porous membranes, and soft-molding of elastomeric precursors on micro-fabricated templates.

10. The micropatterned structure of claim 1, wherein polymeric microstructures are made by soft-molding of elastomeric precursors on micro-fabricated templates.

11. The article of claim 1, wherein the micro-patterned structure is further subjected to treatment methods which improve its adhesions, with said treatment methods comprising at least one of enlargement of the fibrillar tip with mushroom-like shapes, UV/Ozone or oxygen plasma treatment to enhance the wettability of polymer surfaces, and coating with single or multiple layers of polyelectrolytes, comprising polyethyleneimine (PEI), poly(allyl amine) (PAH), polyacrylic acid, polystyrene sulfonate, and poly (diallyl dimethyl ammonium chloride) (PDAC).

* * * * *